Patented Feb. 5, 1935

1,990,245

UNITED STATES PATENT OFFICE 1,990,245

PRODUCTION OF POLYHYDRIC ALCOHOLS

Johannes Mueller, Eppstein, and Ulrich Hoffmann, Ludwigshafen-on-the-Rhine, Germany, assignors to I. G. Farbenindustrie Aktiengesellschaft, Frankfort-on-the-Main, Germany No Drawing. Application April 28, 1930, Serial No. 448,164. In Germany November 18, 1926

8 Claims. (Cl. 260—156.5)

The present invention relates to the production of polyhydric alcohols from aldoses.

It is already known that polyhydric alcohols can be obtained by subjecting aldoses to a treatment with hydrogen in the presence of finely divided platinum and of a considerable quantity of alkali. In this process, however, uniform products cannot be obtained, since the aldoses are converted into isomers by the action of the alkali present so that always mixtures of polyhydric alcohols are obtained; thus for example a mixture of sorbitol and mannitol is obtained when glucose or mannose are treated in the aforesaid manner. Moreover the catalysts consisting of or comprising platinum are rather costly.

We have found that uniform polyhydric alcohols can be obtained by subjecting aldoses to a treatment with hydrogen in the presence of water, a base metal reducing catalyst and of a quantity of alkali providing in the reaction mixture a hydrogen-ion concentration pH between 7 and 12. The term "base metal reducing catalyst" means catalysts consisting of, or essentially comprising nickel, copper or cobalt or their alloys as well as their oxides; the said catalysts may be employed in activated form, such as may be obtained by incorporation of one or more difficultly reducible metal oxides, such as the different oxides of chromium, cerium, titanium, molybdenum, tungsten, thorium or aluminium. The quantity of the catalysts may be as low as 2 per cent by weight of the aldose employed but any higher quantities may be employed, the working life of the catalysts being very long. The alkali which is added to the reaction mixture, or, if desired, to the aldoses before introducing them into the reaction vessel, may be chosen from substances giving an alkaline reaction with water, such as alkali or alkaline earth metal oxides or hydroxides or their alkaline reacting salts as for example carbonates, silicates, borates or other salts thereof with weak acids such as fatty acids, or with alcohols or ammonia or organic nitrogenous bases, such as alkyl or alkylol amines, cyclic bases such as pyridine or piperidine or aromatic bases such as aniline, may be employed. The quantity employed of the said alkalies is so chosen that the hydrogen ion concentration pH in the reaction mixture is smaller than 12, a hydrogen-ion concentration pH below 10 being preferably employed in most cases and a hydrogen ion concentration from 7 to 9 giving usually the best results. The hydrogen ion concentration is usually chosen depending on the nature of the catalyst employed; thus, for example, when the base metal reducing catalysts have been already employed for a long time of working the higher hydrogen ion concentration values within the aforesaid limit are employed, whereas the lower hydrogen ion concentration values are employed when the base metal reducing catalysts are employed in a fresh state. The reaction is carried out in the presence of water which may contain, if desired, alcohols, such as ethylene-glycol or glycerol or other water-soluble organic solvents, such as acetone. The reaction can be accelerated by warming, the reaction being preferably carried out between about 30° and 160° C., and in most cases temperatures between 100° and 160° C. will be applied in order to shorten the period required for the reaction. The reaction may be carried out at a pressure above atmospheric pressure, for example at pressures of 5, 10 and preferably above 10 atmospheres, such as at from 15 to 20 atmospheres or even more, say up to 50 atmospheres, but working at pressures of between 10 and 20 atmospheres is more advantageous since no particularly pressure-tight apparatus is required in these cases. Similarly the reaction is accelerated by the activation of the base metal reducing catalyst with the additions of difficultly reducible metal oxides mentioned above, which are generally employed in a quantity of from 1 to 10 per cent of the base metal reducing catalyst, and usually in a quantity of 2 to 5 per cent, the efficiency of the activators decreasing generally, with the order in which they are enumerated above. It is further advantageous to deposit the catalysts and, if desired, the activators on carriers such as Fuller's earth, kieselguhr, active carbon, silica gel, earthenware shards or other substances with a large superficial area.

The quantity of water employed is generally at least that of the aldose, considerably higher quantities, such as more than 4 times the quantity of aldose, being preferably not employed in order to avoid a tedious evaporation after the reaction. By working in accordance with the present invention the reaction is carried out in a much shorter time than is possible with the aid of catalysts consisting of a noble metal, such as platinum, in the presence of a considerable quantity of alkali, the period of time required for the reaction with a base metal hydrogenating catalyst according to the present invention being about two thirds of that required with the aid of platinum for example, which period of working according to the present invention can be further reduced to about one fourth to one sixth when a base metal hydrogenating catalyst according to the present invention is employed in the activated form. If desired, foaming agents, such as saponins or protective colloids may be added but additions which are soluble in water will generally impair the final products.

The following examples will further illustrate the nature of this invention, but the invention is not restricted to these examples. The parts are by weight.

Example 1

1 part of commercial glucose is mixed with 1 part of water and 1 part of methanol and 0.5 per cent of the glucose of calcium hydroxide are added whereby the hydrogen-ion concentration of the mixture is adjusted to pH=8.1. After adding 3 per cent by weight of the glucose of nickel which has been activated by incorporating therewith 2.5 per cent its weight of chromium oxide, the mixture is subjected to the action of hydrogen at a pressure of 80 atmospheres in a pressure-tight vessel, the reaction mixture being gradually heated during two hours to a temperature of 145° to 150° C. As soon as the said temperature has been attained the reaction is finished and a completely pure and clear solution of sorbitol is obtained.

Example 2

1 part of commercial glucose is mixed with 1 part of water, 1 part of methanol and 0.5 per cent by weight of the glucose of crystalline barium hydroxide whereby the hydrogen-ion concentration of the mixture is adjusted to about pH=8. 0.04 part of a catalyst consisting of 38 parts of nickel deposited on kieselguhr together with 2 parts of chromium oxide, which catalyst may have been applied in a previous operation is then added. After heating the mixture in an autoclave to 130° C. with a quantity of hydrogen furnishing a pressure of 23 atmospheres a solution of sorbitol is obtained from which practically pure sorbitol can be recovered.

Instead of the barium hydroxide the same quantity of strontium carbonate or a double quantity of calcium silicate may be employed or any other alkaline reacting agents in the quantities providing the aforesaid ion concentration. The catalyst may be replaced, if desired, by another one the efficient constituent of which consists of cobalt or a mixture of 60 parts of nickel and 40 parts of cobalt. When alkaline substances which are difficultly soluble, such as magnesium silicates are employed the base metal reducing catalyst may be deposited on the said alkaline substances.

Example 3

10 parts of glucose are mixed with 20 parts of water, 2.5 per cent by weight of the glucose with nickel activated by an addition of 4 per cent its weight of cerium oxide and deposited on Fullers' earth and with 0.5 per cent by weight of the glucose of the calcium compound of glucose. The whole is then heated in an autoclave together with a quantity of hydrogen corresponding to a pressure of from 15 to 20 atmospheres while gradually increasing the temperature to 155° C. When the temperature during the reaction has not exceeded 160° C. pure sorbitol is obtained in a practically quantitative yield without any admixture of mannitol or glucose. The reaction mixture is preferably introduced into the autoclave not as the whole batch, but solely in portions or continuously. The calcium compound can be replaced by other alkaline agents in quantities corresponding to the calcium compound stated, such as calcium compound of sorbitol, calcium glycolate, calcium soaps, calcium salts of aliphatic or aromatic sulphonic acids, such as stearic or naphthalene sulphonic acids, or common soaps of any kind, the foaming property of which can be increased, if desired, by a small quantity of saponin or other foaming agent.

What we claim is:—

1. In the process of producing sorbitol by acting on glucose with hydrogen in the presence of water and of a reducing catalyst, the step which comprises carrying out the reaction in the presence of an active base metal reducing catalyst comprising essentially a metal selected from the group consisting of nickel, cobalt and copper, at a hydrogen-ion concentration of pH between 7 and 12, at a pressure above atmospheric pressure and at a temperature below 160° C.

2. In the process of producing sorbitol by acting on glucose with hydrogen in the presence of water and of a reducing catalyst, the step which comprises carrying out the reaction in the presence of an active base metal reducing catalyst, comprising essentially a metal selected from the group consisting of nickel, cobalt and copper and a small quantity of a difficultly reducible metal oxide at a hydrogen-ion concentration of pH between 7 and 12, at a pressure above atmospheric pressure and at a temperature below 160° C.

3. In the process of producing sorbitol by acting on glucose with hydrogen in the presence of water and of a reducing catalyst, the step which comprises carrying out the reaction in the presence of an active base metal reducing catalyst comprising essentially a metal selected from the group consisting of nickel, cobalt and copper, and a quantity of an alkaline earth metal compound capable of furnishing a hydrogen-ion concentration of pH between 7 and 12, at a pressure above atmospheric pressure and at a temperature below 160° C.

4. In the process of producing sorbitol by acting on glucose with hydrogen in the presence of water and of a reducing catalyst, the step which comprises carrying out the reaction in the presence of an active base metal reducing catalyst, comprising essentially a metal selected from the group consisting of nickel, cobalt and copper and a small quantity of chromium oxide, and a quantity of an alkaline earth metal compound capable of furnishing a hydrogen-ion concentration of pH between 7 and 12, at a pressure above atmospheric pressure and at a temperature below 160° C.

5. In the process of producing sorbitol by acting on glucose with hydrogen in the presence of water and of a reducing catalyst, the step which comprises carrying out the reaction in the presence of an active base metal reducing catalyst comprising essentially a metal selected from the group consisting of nickel, cobalt and copper, and a quantity of an alkaline earth metal hydroxide capable of furnishing a hydrogen-ion concentration of pH about 8, at a pressure above atmospheric pressure and at a temperature below 160° C.

6. In the process of producing sorbitol by acting on glucose with hydrogen in the presence of water and of a reducing catalyst, the step which comprises carrying out the reaction in the presence of an active base metal reducing catalyst comprising essentially nickel and a difficultly reducible metal oxide at a hydrogen-ion concentration of pH between 7 and 12, at a pressure above atmospheric pressure and at a temperature below 160° C.

7. In the process of producing sorbitol by acting on glucose with hydrogen in the presence of water and of a reducing catalyst, the step which comprises carrying out the reaction in the presence of an active base metal reducing catalyst comprising essentially nickel and chromium oxide at a hydrogen-ion concentration of pH between 7 and 12, at a pressure above atmospheric pressure and at a temperature below 160° C.

8. In the process of producing sorbitol by acting on glucose with hydrogen in the presence of water and of a reducing catalyst, the step which comprises carrying out the reaction in the presence of an active base metal reducing catalyst comprising essentially nickel and cerium oxide at a hydrogen-ion concentration of pH between 7 and 12, at a pressure above atmospheric pressure and at a temperature below 160° C.

JOHANNES MUELLER.
ULRICH HOFFMANN.